United States Patent

[11] 3,570,825

| [72] | Inventor | John S. Eckert<br>Silver Lake, Ohio |
|---|---|---|
| [21] | Appl. No. | 742,950 |
| [22] | Filed | June 10, 1968 |
| [45] | Patented | Mar. 16, 1971 |
| [73] | Assignee | Norton Company<br>Continuation of application Ser. No. 592,246, Oct. 17, 1966, now abandoned, which is a continuation-in-part of application Ser. No. 524,992, Dec. 20, 1965, abandoned. |

[54] WEIR FLOW DISTRIBUTORS OF THE PAN TYPE
4 Claims, 6 Drawing Figs.

[52] U.S. Cl..................................................... 261/96, 261/98, 23/283
[51] Int. Cl..................................................... B01f 3/04, B01f 5/18, B01f 15/02
[50] Field of Search........................................ 261/94–98, 110, 111, 112, 114, 109; 23/283, 285

[56] References Cited
UNITED STATES PATENTS

| 723,972 | 3/1903 | Alberger | 261/111 |
| 2,890,870 | 6/1959 | Spiselman | 260/30 |
| 3,363,843 | 1/1968 | Ballard et al. | 261/97x |

FOREIGN PATENTS
726,151  3/1955  Great Britain

OTHER REFERENCES
Support Plates and Distributors for Packed Towers; The U.S. Stoneware Co.; Akron 9, Ohio; Bulletin TA-30; Copyright 1957; Pages 17 and 19 relied on.

*Primary Examiner*—Ronald R. Weaver
*Attorneys*—James Tilberry, Alfred Body and Robert Vickers ABSTRACT: A distributor plate having a plurality of liquid passages therethrough, characterized by perforate liquid diffuser positioned beneath the plate and in correspondence with the passages, to subdivide liquid introduced into the passages, into a plurality of substreams. A plurality of openings in the plate and a cylindrical gas riser of smaller diameter than the openings are positioned in each opening. The gas risers coact with the openings as a core to define a plurality of annular passages through the plate. The liquid diffuser consists of discrete, perforate element in the form of a shallow, annular, open pan positioned below the plate and in correspondence with each of the plurality of passages. The pan has an inner periphery formed integral with the cylindrical gas riser, and an outer periphery of greater diameter than the outside diameter of its corresponding annular passage. Brackets secure a portion of the outer periphery of the annular pan to the plate. The annular passage and the annular pan coact to further divide the streams, each into a plurality of substreams.

PATENTED MAR 16 1971

INVENTOR.
JOHN S. ECKERT

BY

ATTORNEY

INVENTOR.
JOHN S. ECKERT
BY
ATTORNEY

WEIR FLOW DISTRIBUTORS OF THE PAN TYPE

This application is a continuation of my application Ser. No. 592,246, filed Oct. 17, 1966, now abandoned, which is a continuation-in-part of my application Ser. No. 524,992, filed Dec. 20, 1965, now abandoned.

This invention relates to an improvement in distributors, and particularly weir-flow distributors of the pan type; and to towers for the contacting of a gas and liquid, equipped with one or more such distributors. The liquid flowing down through the tower is distributed over a packed bed where it is brought into contact with a gas passing through the tower. The invention includes the operation of such a distributor in a tower.

In the usual pan types of weir-flow distributors, the so-called "pan" is of one of the following two types: (1) it covers the whole cross-sectional area of the tower. (2) It is a smaller pan which covers a fraction of the area within the tower. In either type there are many risers. The risers provide passage of the gases throughout the area covered by the pan. The weirs in the risers are usually V-shaped but may be rectangular or of any equivalent structure. There may be one, two or more weirs in each riser. The amount of liquid overflowing from the distributor through these weirs and the risers to the portion of the tower below it depends upon the head of liquid above the bottom of the weir. This liquid pours down through the risers, and causes resistance to the upward flow of the gases. One problem with such distributors has been getting the gas past the pan in adequate volume without excessive pressure drop which results in extreme entrainment of liquid in the gas in the form of small droplets. Also, with distributors of this type it has been difficult to get a sufficient number of distribution points of a dependable nature to uniformly wet the packed bed, over a wide range of liquid rates, for the delivery of the liquid on to the surface of a packed bed within a tower.

According to this invention, the liquid is collected in a main pool about the risers and does not flow down through the risers but through separate openings surrounded by walls provided with V-weirs or the like, and the liquid which flows down through these openings is collected in shallow perforated pans which distribute the liquid over the packed bed. In the preferred distributor, the openings through which the liquid drains from the main pool, surround each riser and are adjacent to it, and there is a separate pan under each riser which supports the risers. These pans are annular and are larger in outside diameter than the walls which surround the risers. The bottoms of the pans are often perforated, and when there is only a small amount of liquid to be distributed it flows through the perforations giving it very uniform distribution over the packed bed below it. When the liquid falling into such a pan is too great to flow through the perforations in its bottom, it flows over the shallow peripheral wall and is thus even more widely distributed over the packed bed. Thus it is possible by means of this device to not only get superior liquid distribution over the presently used device but to get it over a very wide range of liquid flow rates. It is obvious that there need not be a separate pan under each riser, but a large pan may be used in which in addition to the perforations there are larger openings, relatively uniformly distributed with a shallow wall surrounding each, the same height as the peripheral wall of the pan. In addition there are openings which permit the gases to rise up into the risers. The risers may be supported by the pans, or by other means.

This type of riser provides a continuous flow of liquid through the perforations in the pans, and a shower of liquid over the edges of the pans when there is a large flow of liquid, thus giving very good liquid distribution over wide ranges of liquid flow rates, and very superior liquid distribution, particularly at low liquid flow rates. It has the further advantage that the gas moving through the risers is kept separate from the liquid and encounters no counterflow liquid resistance. Such resistance greatly reduces the gas-handling capacity of the present-day weir-flow distributors of the pan type.

The invention includes a further improvement which is applicable to the second of the two defined pan-type, weir-flow distributors. This is the type in which the pan covers only a fraction of the cross-sectional area of the tower. With this type of distributor, used in an operation in which the gases are rising through the tower, a large percentage of the gases flowing through the tower flows around the pan instead of through the risers or other openings in the distributor. When the gases pass through the distributor they carry with them a large amount of liquid mist generated from the movement of the liquid in flowing through the distributor. To prevent such entrainment of mist, a liquid baffle is provided below the edge of the floor of the distributor, which diverts the flow of liquid from the rising gases at the edge of the tower, thus reducing liquid entrainment in the gas stream. By decreasing the amount of mist carried by the gases, the efficacy of the distributor is immensely improved.

The distributor of this invention is designed particularly for use over packed beds where it is known that superior distribution of liquid will give superior performance. Good operation over a wide range of liquid rates greatly improves the versatility of the tower in distillation, absorption, and stripping operations. Without good distribution of liquid the efficiency of packed towers falls off rapidly as their burden is reduced from maximum design capacity.

Although usually the gases flow up through the tower, the distributor is effective with gases passing through the tower in either direction.

The invention is further described in connection with the accompanying drawings, in which.

Figure 1:
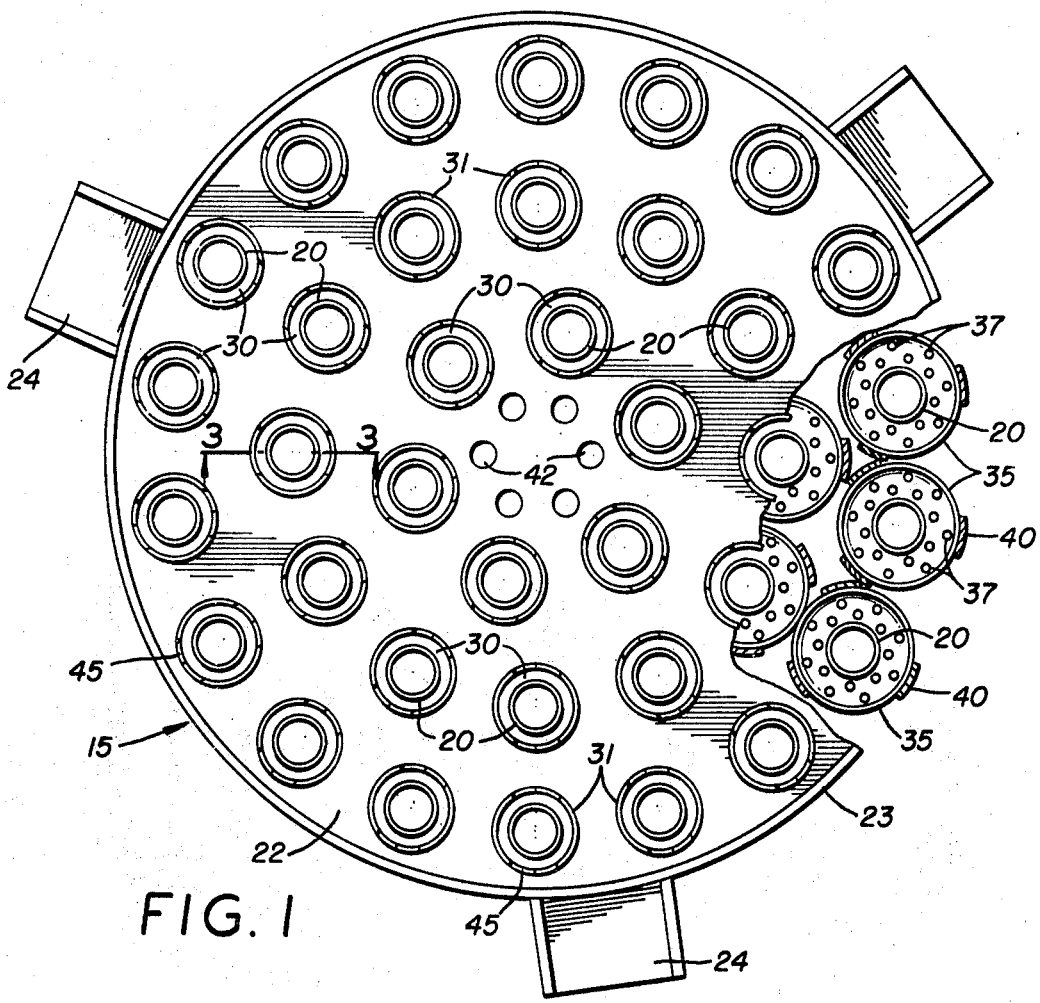
FIG. 1 is a plan view of a distributor designed to cover a portion of the cross-sectional area of a tower, with a portion cut away to show pans beneath it.

The tower 5 is of any usual type—generally cylindrical. It may be of tile, steel or other construction. It is provided with gas inlet 7 and outlet 8, and in the preferred form of the invention, which is illustrated, the liquid inlet 10 and drain 11 are in the top and bottom of the tower, respectively, although on occasion it will be desirable to have the gas flow down through the tower. The incoming liquid is fed on to the distributor 15. The distributor need not be located at the top of the tower, but there may be several distributors throughout the tower for collection and redistribution of liquid flowing down through the tower. There are one or more beds 17 of packing elements, each supported by a plate 18 of any suitable design.

In the drawing, there is a countercurrent flow of gas and liquid through the tower. The liquid distributed over the one or more beds 17 by the one or more distributors 15 is spread over the packing elements where it is brought into intimate contact with the rising gases.

On reaching a distributor, some of the gases pass up through the risers 20, some pass up between the distributor wall 23 and the wall of the tower. No liquid flows through the inner risers so there is no appreciable drop in the pressure of the gases as it passes through the distributor. The floor 22 of the distributor is surrounded by the liquid-retaining wall 23, and is provided with supports 24 for supporting it on a ledge or on brackets in a tower.

There is an annular gap 30 between each riser and the retaining wall 31 which surrounds each gap. Annular pans 35 for collection and distributing the liquid are provided under each gap 30. These pans 35 are preferably of metal and are pierced at 37 to form weep holes uniformly distributed over the surface of the pan. A shallow wall 39 surrounds each pan. These pans are supported from the floor 22 by narrow brackets 40, and the pans 35 support the risers. Such pans are useful in other distributors and my application Ser. No. 524,994 filed Dec. 20, 1965 and now U.S. Pat. No. 3,392,967 shows their use in trough-type distributors.

The risers, gaps, etc. may be uniformly distributed over the floor of the distributor, but that is not necessary, as indicated in FIG. 1. As illustrated, the central (or some other portion) of the floor may be perforated at 42 to distribute liquid over the bed.

With distribution of the liquid in two stages, first through the annular openings 30 and then from the pans, errors due to hydraulic gradient across the plate are minimized. The distributor is made self-cleaning because sludge or other matter which tends to collect is washed away when the pans overflow. A main advantage of this structure and operation is that it provides a large number of liquid distribution points over a very wide range of liquid flow rates and at zero back pressure on the feed liquor supply.

The weirs 45 or weirs of other design provide for the flow of a larger volume of liquid as the height of the liquid rises, thus maintaining a relatively uniform head of liquid over the floor, including the portion which contains the openings 42.

The riser-gap arrangement provides superior distribution. Separate passages are provided for the gas and liquid. The V-weirs maintain the flow of liquid to each unit area relatively the same. If there are perforations 42, they should handle only a small amount of the liquid. Their chief purpose is to weep the plate dry during shutdowns. The liquid level must always be above the bottoms of the V-weirs in order to provide constant flow over them and through the gaps. The liquid draining through the gaps is collected in the pans or distributing means 35. There is a constant drain from these through the distribution holes 37, and as the liquid loading increases and the liquid level in the pans rises above the shallow walls 39, it overflows with relatively uniform distribution on to the packed bed beneath it.

Figure 2:
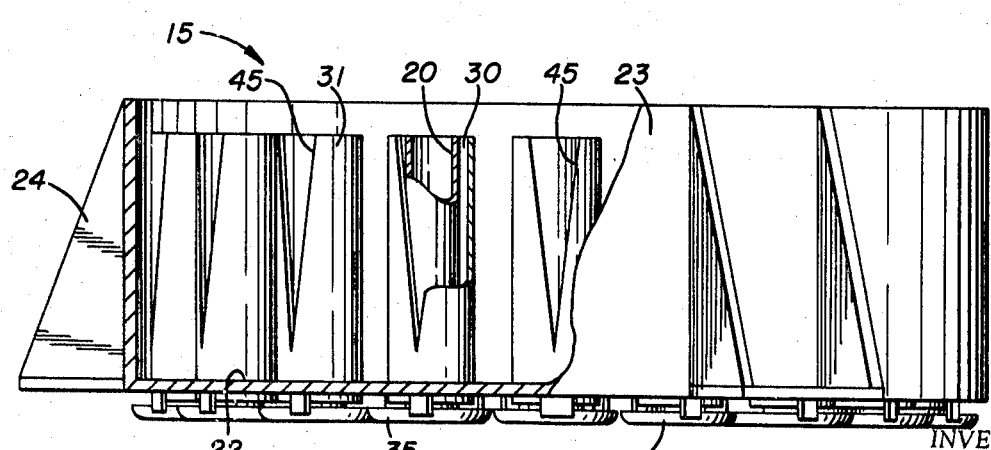
FIG. 2 is an elevation of the distributor with a part broken away.
Figure 3:
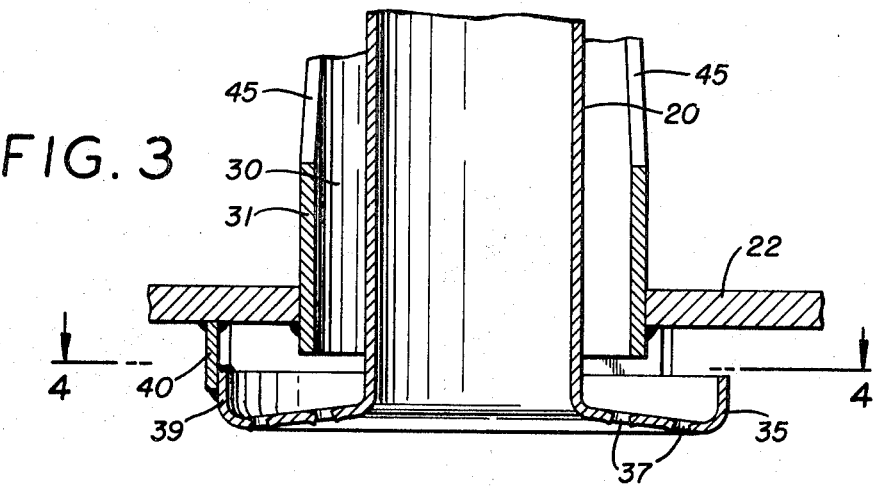
FIG. 3 is an enlarged detail on the line 3–3 of FIG. 1.
Figure 4:
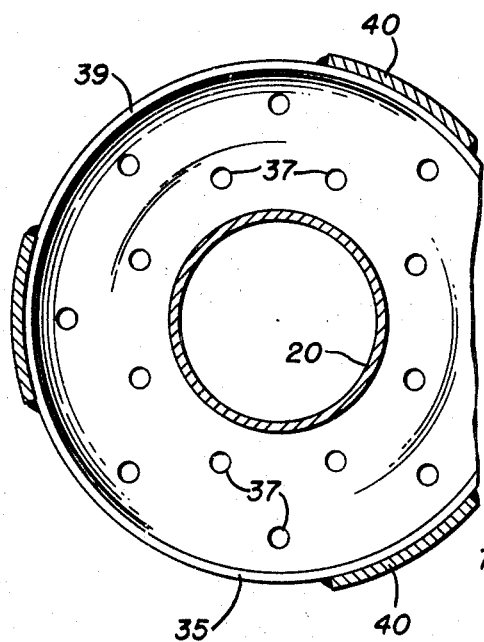
FIG. 4 is a detail section on the line 4–4 of FIG. 3.
Figure 5:
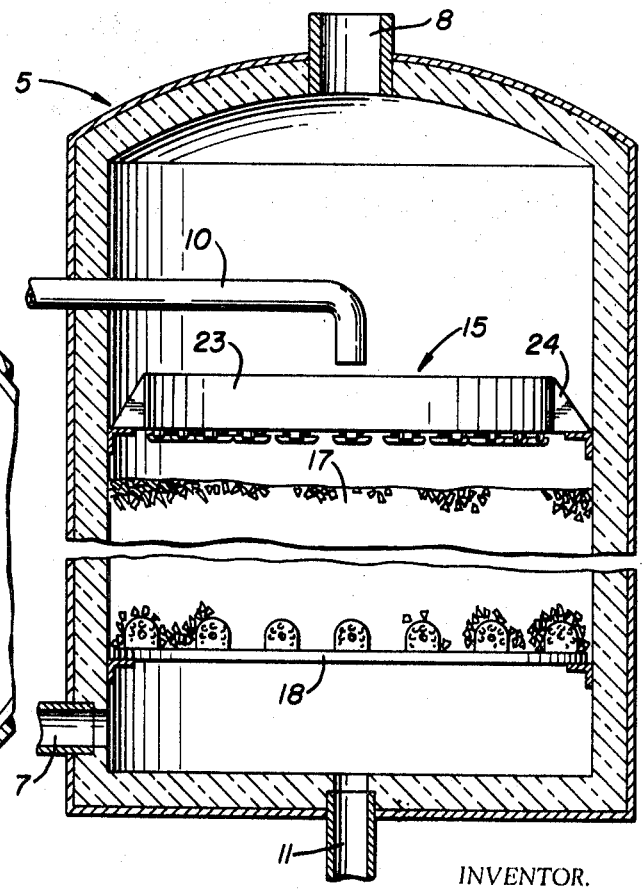
FIG. 5 is a section through a tower with the distributor installed in it.
Figure 6:
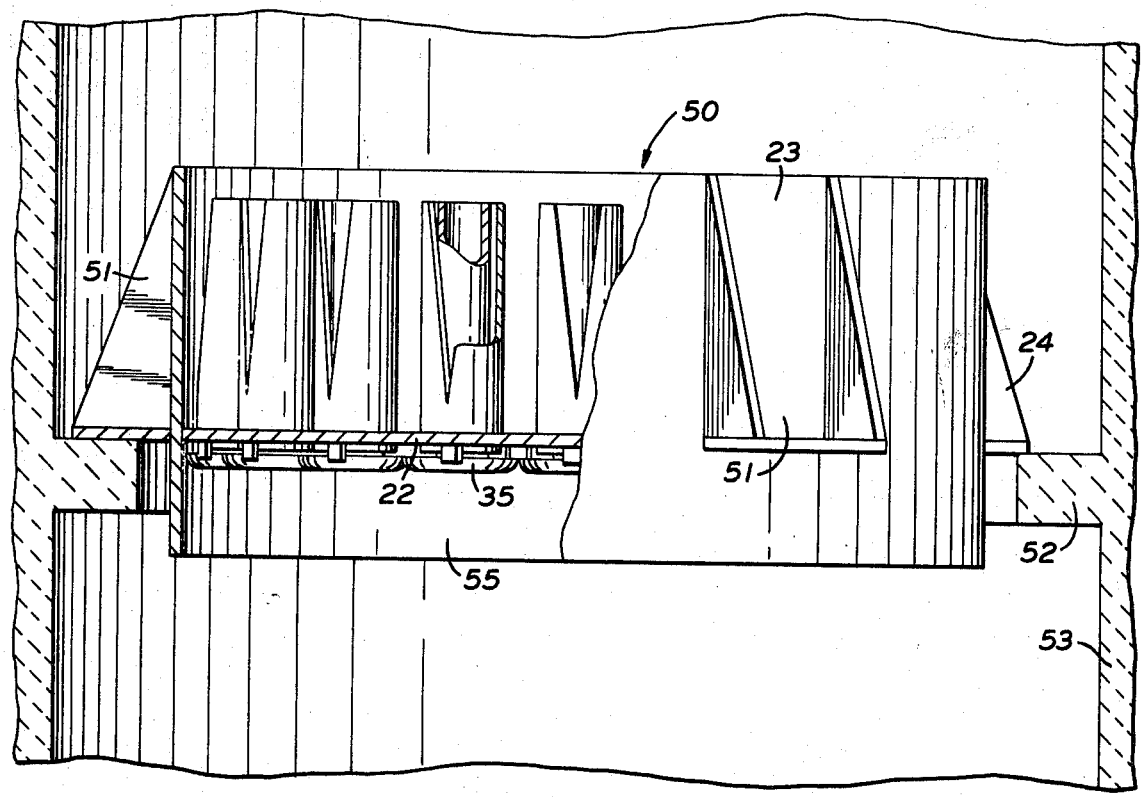
FIG. 6 is an elevation, partly in section, of a tower with a distributor in it with a gas baffle extending down from the distributor floor.

FIG. 6 illustrates a pan-type of distributor 50 which is substantially smaller in diameter than the interior of the tower. Supports 24 which extend outwardly from the distributor rest on the ledge or bracket 52 which projects in from wall 53 of the tower. The risers, etc. are the same as shown in FIG. 2. The wall 23 which is above the floor in both FIGS. 2 and 6, extends below the floor in FIG. 6 and forms baffle 55. There is no resistance to the upward flow of the gases outside of this wall, whereas within the wall, the distributor parts cause resistance, and back pressure develops which causes a larger percentage of the gases to be diverted and flow up through the free space between the baffle 55 and the wall 53. The baffle 55 extends a sufficient distance below the pans 35 or other bottommost part of the distributor to form a gas pocket which diverts the gases outside of the baffle. Although the diverted gases may carry some mist from the liquid draining from the distributor on to the bed of packing elements located below it, these gases which flow up adjacent the wall of the tower do not pass through the distributor and do not pick up any mist created within the distributor such as may be picked up by the gases which flow through the distributor. As a result, the gases leaving the top of the tower are surprisingly free of the liquid, and the efficiency of the tower is increased.

The invention is covered in the claims which follow.

I claim:

1. In a distributor comprising a plate adapted to confine a pool of liquid of predetermined head therein, a plurality of openings in said plate, a cylindrical gas riser of smaller diameter than said openings positioned in each opening and coacting therewith as a core to define a plurality of annular passages through said plate, said passages being operative to divide liquid exceeding said predetermined head into a plurality of streams, the improvement comprising a plurality of discrete, perforate, liquid-diffusing means each in the form of a shallow, annular, open pan positioned below said plate and in correspondence with each of said plurality of passages, said pan having an inner periphery formed integrally with said cylindrical gas riser, and an outer periphery of greater diameter than the outside diameter of its corresponding annular passage, and means including brackets securing a portion of the outer periphery of said annular pan to said plate, whereby said annular passage and said annular pan coact to further divide said streams, each into a plurality of substreams.

2. In a distributor comprising a plate, a plurality of gas risers extending through said plate, each circumscribed by a spaced, concentric weir, defining an annular passage for liquid therebetween, the improvement comprising liquids diffusing means, in the form of a shallow, annular, perforate, open pan, positioned beneath each said passage, said pan having an inner periphery formed integrally with said gas riser, said pan coacting with said passage to divide into a plurality of streams, liquid introduced into said passage.

3. The distributor as defined in claim 2 wherein the outside diameter of said annular pan is greater than the outside diameter of its corresponding annular passage.

4. The distributor as defined in claim 2 including means securing at least a portion of the outer periphery of said annular pan to said plate.